(12) United States Patent
Topliss

(10) Patent No.: US 8,395,855 B2
(45) Date of Patent: Mar. 12, 2013

(54) SHAPE MEMORY ALLOY ACTUATION APPARATUS

(75) Inventor: Richard Topliss, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 130 days.

(21) Appl. No.: 13/129,520

(22) PCT Filed: Nov. 20, 2009

(86) PCT No.: PCT/GB2009/002720
§ 371 (c)(1),
(2), (4) Date: Jun. 13, 2011

(87) PCT Pub. No.: WO2010/058177
PCT Pub. Date: May 27, 2010

(65) Prior Publication Data
US 2011/0255184 A1    Oct. 20, 2011

(30) Foreign Application Priority Data

Nov. 20, 2008  (GB) .................................. 0821227.6
Jun. 25, 2009  (GB) .................................. 0911030.5

(51) Int. Cl.
*G02B 7/02* (2006.01)
(52) U.S. Cl. ........ 359/823; 359/694; 359/824; 348/345; 348/340
(58) Field of Classification Search .................. 359/823, 359/824, 694
See application file for complete search history.

(56) References Cited

U.S. PATENT DOCUMENTS

| | | | |
|---|---|---|---|
| 5,459,544 A | 10/1995 | Emura | |
| 6,574,958 B1 | 6/2003 | MacGregor | |
| 2006/0098968 A1* | 5/2006 | Ito et al. | 396/85 |
| 2008/0282696 A1 | 11/2008 | Wada et al. | |
| 2009/0295986 A1 | 12/2009 | Topliss et al. | |
| 2010/0060776 A1 | 3/2010 | Topliss et al. | |
| 2010/0283887 A1* | 11/2010 | Topliss et al. | 348/345 |

FOREIGN PATENT DOCUMENTS

| | | |
|---|---|---|
| EP | 1640757 A1 | 3/2006 |
| EP | 1914422 A1 | 4/2008 |
| EP | 2239610 A1 | 10/2010 |
| GB | 2432909 A | 6/2007 |
| JP | 2004333995 A | 11/2004 |
| JP | 2006330542 A | 12/2006 |
| WO | WO-2005093510 A2 | 10/2005 |

(Continued)

Primary Examiner — James Jones
(74) Attorney, Agent, or Firm — Harness, Dickey & Pierce, P.L.C.

(57) ABSTRACT

A shape memory alloy actuation apparatus comprises a camera lens element supported on the support structure by a plurality of resilient flexures that guide movement of the movable element along the optical axis. A shape memory alloy actuator biassed by the resilient flexures and an additional resilient biasing element is arranged to drive movement of the camera lens element. An end-stop limits movement of the camera lens element at a position where the shape memory alloy actuator has a predetermined length that is above the length corresponding on the local maximum resistance by an amount not greater than 15% of the difference between (i) the length corresponding to the local maximum resistance and (ii) the length corresponding to the local minimum resistance.

20 Claims, 2 Drawing Sheets

FOREIGN PATENT DOCUMENTS

| | | |
|---|---|---|
| WO | WO-2006054535 A1 | 5/2006 |
| WO | WO-2007-113478 A1 | 10/2007 |
| WO | WO-2008-099155 A1 | 8/2008 |
| WO | WO-2008-099156 A2 | 8/2008 |
| WO | WO-2008-129291 A2 | 10/2008 |
| WO | WO-2008129290 A1 | 10/2008 |
| WO | WO-2009056822 A2 | 5/2009 |
| WO | WO-2009-071898 A2 | 6/2009 |

\* cited by examiner

SHAPE MEMORY ALLOY ACTUATION APPARATUS

CROSS-REFERENCE TO RELATED APPLICATIONS

This application is a 371 U.S. National Stage of International Application No. PCT/GB2009/002720, filed Nov. 20, 2009. This application claims priority to British patent application No. 0821227.6, filed with the Intellectual Property Office on Nov. 20, 2008, and British patent application No. 0911030.5, filed with the Intellectual Property Office on Jun. 25, 2009, both of which applications are herein incorporated by reference in their entirety.

The present invention relates to a shape memory alloy (SMA) actuation apparatus in which an SMA actuator is used to drive movement of a movable element supported on a support structure.

The present invention is generally applicable to any type of movable element but has particular application to actuation of a camera lens element, for example of the type used in a miniature camera which may be employed in a portable electronic device such as a mobile telephone or a mobile digital data processing and/or transmitting device. In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focussing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element. Conventionally a biasing arrangement provides a bias force in an opposite direction from the force applied by the SMA actuator on contraction.

The use of SMA material as an actuator for a small object such as a camera lens element of a miniature camera provides the advantages of being intrinsically linear, providing a high power per unit mass, being a low cost commodity item and being a relatively small component.

To provide precision control of the movement of the movable element, it is necessary to control the temperature of the SMA actuator by varying the drive current. This requires a complex control algorithm. In principle, the control could be based on the output of a sensor that directly measures the position of the movable element or the temperature of the SMA actuator but such sensors are costly and difficult to implement in practice. Therefore an alternative approach is to base the control on the resistance of the SMA actuator. The resistance may be measured by a resistance measurement circuit which is straightforward to implement, essentially just requiring extra components in the control circuit. Precision control based on resistance may be achieved, for example by closed-loop control using resistance feedback to control the resistance in an operating range between the local maximum resistance and the local minimum resistance of the SMA actuator, for example as disclosed in U.S. Pat. No. 6,574,958 and WO-2007/113478.

Nonetheless, the control algorithm does need to be relatively complex due to non-linearities in how the resistance of the SMA actuator varies with position, both as a result of the inherently non-linear physical phase change occurring in the SMA material and due to variations occurring over time and between different apparatuses. Specifically, it is found that as the SMA actuator is used, typically the SMA actuator stretches, and also the available closed-loop strain reduces. It would be desirable to provide precision control that compensates for changes in the SMA material of this nature over the lifetime of the SMA actuator apparatus. Similarly, it would be desirable to provide precision control that compensates for variations in the performance of different modules owing to manufacturing tolerances.

WO-2008/099156 discloses an SMA actuator apparatus provided with an end-stop arranged to limit movement of the movable element on extension of the SMA actuator at a position where the SMA actuator has a predetermined length that is at or below the length corresponding to the local maximum resistance. As the end-stop limits the extension of the SMA actuator, the position of the movable element in the unheated state of the SMA actuator is fixed by the position of the end-stop. As a result of this position corresponding to a length of the SMA actuator at or below the length corresponding to the local maximum resistance, the end-stop effectively reduces the strain in the SMA actuator. During heating of the SMA actuator the phase transformation initially occurs without causing contraction driving movement of the movable element, until there is sufficient stress in SMA actuator to move the movable element off the end-stop, and thereafter movement is driven as though the end-stop is not present. This arrangement has the benefit that the starting position of the range of movement of the movable element is controlled by the position of the end-stop. However, it would be desirable to improve this arrangement.

According to the present invention, there is provided shape memory alloy actuation apparatus comprising:

a support structure;

a movable element supported on the support structure by a suspension system which guides movement of the movable element along a movement axis;

a shape memory alloy actuator biassed against contraction by a resilient biassing arrangement and arranged on contraction to drive movement of the movable element relative to the support structure, the shape memory alloy actuator under the influence of the resilient biassing arrangement having a property that resistance varies with decreasing length on contraction, and in the absence of end-stops limiting movement, along a curve passing through a local maximum resistance and thereafter through a local minimum resistance; and an end-stop arranged to limit movement of the movable element on extension of the shape memory alloy actuator at a position where the shape memory alloy actuator has a predetermined length that is above the length corresponding on said curve to the local maximum resistance by an amount not greater than 15% of the difference between (i) the length corresponding on said curve to the local maximum resistance and (ii) the length corresponding on said curve to the local minimum resistance.

Positioning the end-stop in this range of positions has been found to render the length of the SMA actuator and hence the position of the movable element corresponding to the local maximum resistance sufficiently consistent over the lifetime of the SMA actuation apparatus, whilst at the same time providing an optimal operating range of resistance for controlling the position on the basis of the measured resistance.

It has been found that the presence of the end-stop affects and substantially fixes the length of the SMA actuator and hence the position of the movable element that corresponds to the maximum resistance. The reasons for this are discussed further below, but nonetheless is observed as an empirical result, even when the end-stop is at a position where the SMA actuator has a length above the local maximum resistance, rather than at or below the local maximum resistance as disclosed in WO-2008/099156.

A related empirical observation is that over the lifetime of the SMA actuator, in which the SMA actuator is cycled, fatigues and stretches, the presence of the end-stop makes the position that corresponds to the maximum SMA resistance relatively invariant if the end-stop is located at a position where the length of the SMA actuator is in the range above the length corresponding to the local maximum resistance by an amount not greater than 15% of the difference between (i) the length corresponding the local maximum resistance and (ii) the length corresponding to the local minimum resistance. This means that the local maximum resistance, optionally with a predetermined decrement, can be used as the limit of the operating range of resistance that is sufficiently invariable over the lifetime of the SMA apparatus.

At the same time, as the end-stop is at a position where the SMA actuator has a length above the local maximum resistance, the end-stop does not limit the operating range. This contrasts with the situation disclosed in WO-2008/099156 where the SMA actuator has a length at or below the local maximum resistance and hence tends to limit the operating range.

The SMA actuation apparatus may control the SMA actuator using the local maximum resistance as a reference. For example, in the case that the movable element is a camera lens element the position of the local maximum resistance, optionally with a predetermined decrement may be set as the infinity position of the camera lens element.

Control using the local maximum resistance as a reference may be achieved by closed-loop control using resistance feedback. Thus the SMA actuation apparatus may include a control circuit that includes a resistance measurement circuit arranged to output a measure of the resistance of the SMA actuator and a controller arranged to vary the power of the drive current to provide closed-loop control of the resistance of the SMA actuator based on the measure of the resistance of the SMA actuator output by the resistance measurement circuit. The resistance may be controlled within an operational range defined by an upper limit at or below the local maximum resistance and a lower limit at or above the local minimum resistance. The upper limit may therefore be defined as the local maximum resistance or the local maximum resistance less a predetermined decrement.

Advantageously, the lower limit is defined as the local maximum resistance less a predetermined decrement. This means that the SMA actuator need be driven only as far as is needed, which actually aids in minimising the fatigue of the SMA actuator over lifetime, and hence extends the overall lifetime. Over that lifetime, the length of the SMA actuator increases, and the available dynamic strain decreases. However, whilst the stroke available between local maximum resistance and the local minimum resistance decreases, this phenomenon is hidden in that the resistance continues to be driven to the local maximum resistance less the predetermined decrement.

The present invention may advantageously be applied to a movable element that is a camera lens element, the suspension system guiding movement of the camera lens element relative to the support structure along the optical axis of the camera lens element. It is particularly suitable for a miniature camera lens element, being a camera lens element including one or more lenses having a diameter of at most 10 mm. However similar advantage is achieved when applied to other types of movable element.

To allow better understanding, an embodiment of the present invention will now be described by way of non-limitative example with reference to the accompanying drawings, in which.

There will first be described the structure of a camera 1 incorporating an SMA actuation apparatus. The camera 1 is to be incorporated in a portable electronic device such as a mobile telephone, media player or portable digital assistant.

Figure 1:
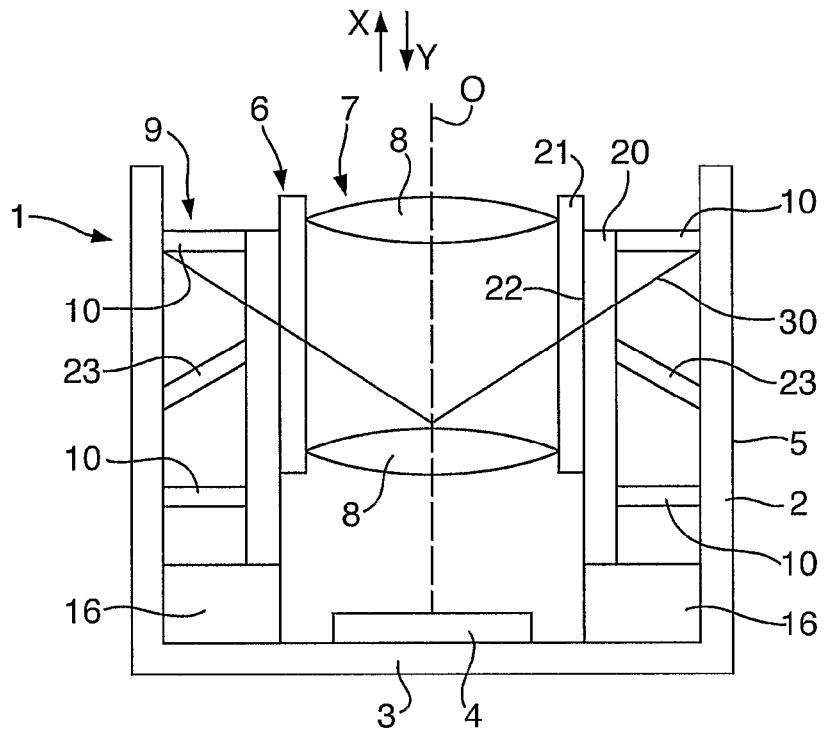
FIG. 1 is a schematic, cross-sectional view of a camera incorporating an SMA actuation apparatus.

The camera 1 is shown schematically in FIG. 1 which is a cross-sectional view, the cross-section being taken along the optical axis O of the camera 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. Although two lenses 8 are shown in FIG. 1, in general, there may be a single lens 8 or plural lenses 8 as needed to provide the desired balance of optical performance and low cost. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 may have a two-part construction comprising a lens carrier 20 and a lens holder 21 mounted inside the lens carrier 20 on an internal screw thread 22 formed inside the lens carrier 20. Typically the lens holder 21 has a diameter of 6.5 mm. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The lens element 6 is suspended on the support structure 2 by a suspension system 9 comprising a plurality of flexures 10 connected between the annular wall 5 of the support structure 2 and the lens element 6. The resilient flexures 10 deflect to guide movement of the lens element 6 along the optical axis O whilst resisting movement of the lens element 6 perpendicular to the optical axis O. Such movement of the lens element 6 changes the focus of the image formed on the image sensor 4. The camera 1 further comprises an SMA actuator 30 which comprises a piece of SMA wire mechanically connected to the annular wall 5 of the support structure 2 and to the lens carrier 20 of the lens element 6. The SMA actuator 30 is held in tension. On heating, the SMA actuator 30 contracts, driving movement of the lens element 6 in a first direction X along the optical axis O away from the image sensor 4.

The camera 1 further comprises a biasing element 23 coupled between the support structure 2 and the lens element 6. The biassing element 23 comprises a resilient flexure which deflects on movement of the lens element 6 along the optical axis O. The biassing element 23 is always deflected in the first direction X so that it applies a force in a second, opposite direction Y. Over the range of movement of the lens element 6, the flexures 10 are also deflected so that they also provide a biassing force in the direction Y.

On heating of the SMA actuator 30 the stress therein increases until it overcomes the biassing element 23 and the flexures 10. The SMA actuator 30 contracts moving the lens element 6 away from the image sensor 4. The lens element 6 moves over a range of movement as the temperature of the SMA actuator 30 increases over the range of temperature in which the transition of the material of the SMA actuator 30 from the Martensite phase to the Austenite phase. Conversely, on cooling of the SMA actuator 30 so that the stress therein decreases, the biassing provided by the biassing element 23 and the flexures 10 causes the SMA actuator 30 to expand moving the lens element 6 towards the image sensor 4.

Thus the biassing element 23 and the flexures 10 together constitute a resilient biassing arrangement biassing the SMA actuator 30 against contraction.

The support structure includes an end-stop 16 which engages the lens element 6 to limit the movement of the lens element 6 towards the image sensor 4. The lens element 6 is shown in FIG. 1 in its rest state in which the SMA actuator 30 is not active and hence the biassing element 23 biasses the lens element 6 against the end-stop 16. This is the closest position of the lens element 6 to the image sensor 4 within its range of movement. The position of the end-stop 16 is selected so that in this state the biassing element 23 is deflected in the first direction X so that it applies a force in the second direction Y. As the SMA actuator 30 is not active, this force holds the lens element 6 firmly in position against the end-stop 16.

The camera 1 is arranged such that the force applied by the biassing element 23 at this position is greater than the force applied by the flexures 10 of the suspension system 9. Typically, at the rest position shown in FIG. 1 the flexures 10 of the suspension system 9 are not deflected at all so they apply no force. However, in principle, the flexures 10 of the suspension system 9 could be deflected by a positive or negative amount so that they apply a negative or positive force, provided that the value of this force is less than the value of the force applied by the biassing element 23.

However, the biassing element 23 is optional. In the absence of the biassing element 23, solely the flexures 10 constitute a resilient biassing arrangement biassing the SMA actuator 30 against contraction.

The support structure may include a further end-stop (not shown) to limit the movement of the lens element 6 away from the image sensor 4, positioned so that the further end-stop does not contact the lens element 6 in normal operation but is provided as a safety measure to limit the maximum deflection, and hence stress when the camera 1 is subject to external forces.

Except for the location of the end-stop 16, the camera may have a detailed structure including a biassing element as disclosed in WO-2009/056822 and British Patent Application No. 0904213.6 filed 11 Mar. 2009, or excluding a biassing element 23 as disclosed in WO-2007/113478 and WO-2008/099156, all of which are incorporated herein by reference.

The position of the end-stop 16 will now be described in detail. To explain this, there will first be described the resistance-length property of the SMA actuator 30 during contraction. This is shown in FIG. 2 which is a graph of the resistance R of the SMA actuator 30 varying, in the absence of end-stops limiting movement, with the position x of the movable element (the position x increasing with increasing distance from the image sensor 4 and hence the length of the SMA actuator 30 decreasing with increasing position x).

On heating of the SMA actuator 30, there is an increase of resistivity with temperature as for most materials. This occurs inside and outside the range of temperature over which the phase-change occurs (the phase transition range) and hence over which the SMA actuator 30 contracts.

However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 2:
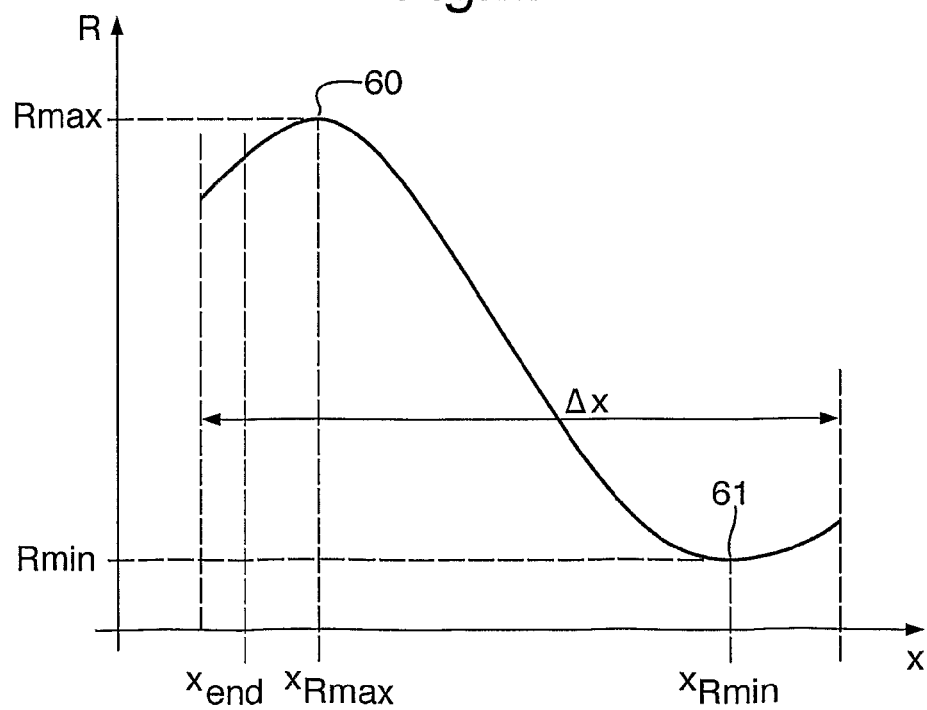
FIG. 2 is a graph of the resistance-length property of the SMA actuator during contraction, illustrating the location of the end-stop.

Thus, the SMA actuator 30 has a property that resistance varies with length during heating and contraction along a curve of the form shown in FIG. 2. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax at the position $x_{Rmax}$. The resistance then falls across the major part of the positional range $\Delta x$ to a local minimum 61 having a resistance value Rmin at the position $x_{Rmin}$. Then the resistance rises across a small final part of the positional range $\Delta x$. For the most part of the range between the local maximum 60 and the local minimum 61, the curve is linear.

The end-stop 16 is located at a position $x_{end}$ where the SMA actuator 30 has a predetermined length that is above the length corresponding to the local maximum 60 by an amount not greater than 15% of the difference between (i) the length corresponding to the local maximum 60 and (ii) the length corresponding to the local minimum 61. Mathematically this may be expressed by the following equations:

$$x_{end}x_{Rmax}-k(x_{Rmax}-x_{Rmin}), \text{ where } 0<k\leq 15\%$$

Positioning the end-stop in this range of positions has been found to render the length of the SMA actuator 30 and hence the position of the lens element 6 corresponding to the local maximum 60 sufficiently consistent over the lifetime of the camera 1, whilst at the same time providing an optimal operating range of resistance for controlling the position x on the basis of the measured resistance. This is for the following reasons.

It is found empirically that the presence of the end-stop 16 affects and substantially fixes the actuator position that corresponds to the local maximum 60. This can be intuitively understood by noting that when the lens element 6 is on the end-stop 16, the end-stop 16 takes up to all of the opposing actuator forces generated by the resilient biassing arrangement meaning that the SMA actuator 30 can relax and the stresses can be low. As the SMA actuator 30 is heated, starting from the position $x_{end}$ of the end-stop 16, the SMA actuator 30 takes an increasing proportion of the bias load until the SMA actuator 30 is taking the whole load and lifts off the end-stop 16. It is known that the phase-transition temperatures of the SMA actuator 30 are altered by the mechanical stress in the SMA actuator 30. As the stress is increased, the phase transition temperatures also increase. Thus the resistance-length property of the SMA actuator 30 during contraction has the same form as shown in FIG. 2, but the position of the local maximum 60 is changed.

This property is separately used to achieve the hot operating performance requirements for the SMA actuator 30 by suitably designing the biassing element 23 and/or flexures 10 of the resilient biassing arrangement so that the stresses and hence transition temperatures of the SMA actuator 30 are higher than the required operating ambient temperature range.

Therefore the upshot of the presence of the end-stop 16 is that when the SMA actuator 30 is on the end-stop 16 and the stresses in the SMA actuator 30 are low, the phase transition temperature is also low, and so the SMA actuator 30 begins to contract and hence take up some of the bias load at a relatively low temperature. As the SMA actuator 30 takes up more of the load, the phase transition temperature increases. All this occurs with the actuator still on the end-stop 16. The actual position $x_{Rmax}$ and temperature that corresponds to the local maximum 60 is the result of the interaction of different phenomena of the SMA material. The contraction of the SMA actuator 30 tends to reduce resistance but no actual length change occurs until the actuator lifts-off the end-stop 16, but the increase in temperature tends to increase the resistivity of the SMA material.

To further illustrate, if for a given camera the SMA actuator 30 is relatively long, there will be more slack to take up before lifting-off the end-stop 16, but this can happen at a relatively low temperature, as the stresses are low. For short wires, the reverse is true. Therefore the end-stop 16 provides a form of "negative feedback" on the influence of the length of the SMA actuator 30, tending to reduce the variation in the actuator position that corresponds to the local maximum 60. This qualitative explanation of some of the phenomena, helps to understand the physical reasons for the empirical result that the presence of the mechanical end-stop 16 influences the position $x_{Rmax}$ at which the local maximum 60 occurs.

A related empirical observation is that whilst over the lifetime of the SMA actuator 30, as the SMA actuator 30 is cycled, the SMA actuator 30 fatigues and stretches, the presence of the end-stop 16 makes the position $x_{end}$ that corresponds to the local maximum 60 relatively invariant. Further to this, it is found that this invariance in the position $x_{end}$ still occurs even if the end-stop 16 is located at a position the SMA actuator 30 has a predetermined length that is above the length corresponding to the local maximum 60. This phenomenon can be used in two ways.

Firstly, one of the important features of the SMA actuator 30 when used for focussing the lens element 6 is that the position that corresponds with far-field focus (which may be the infinity position or the hyperfocal position) can be located without using an autofocus algorithm and without feedback from the image sensor 4.

In WO-2008/099156, this is achieved by locating a mechanical end-stop at a position where the SMA actuator has a length at or below the local maximum resistance, so that the end-stop 16 itself can be used as the far focus position, and the length of the SMA actuator 30 can be controlled in the closed-loop region as the SMA actuator 30 is lifted off the end-stop 16. However, this case by necessity forms a limit to the available closed-loop stroke, because to achieve this for a practical camera, due to manufacturing tolerances the end-stop 16 is designed to be located at a position where the SMA actuator has a length below the local maximum resistance.

However, given the empirical observation described, it is now found that the key benefits of the end-stop 16 for helping set the far focus position can be achieved even when the end-stop 16 is not actually located at the far focus position, but beyond it. In this way, in the camera 1 the end-stop 16 is located at a position where the SMA actuator has a length below the local maximum 60, but sufficiently close to the local maximum 60 to influence its position and both reduce variability between different instances of the camera 1 and over the lifetime of a specific camera 1. In practice this is achieved if the end-stop 16 is within 15% of the difference between (i) the length corresponding to the local maximum 60 and (ii) the length corresponding to the local minimum 61. Desirably, the end-stop 16 is located far enough away to avoid significantly limiting the available closed-loop stroke from the actuator. When the end-stop 16 is positioned in this way, the local maximum 60 or the local maximum 60 less a predetermined decrement, which defines the upper limit of the operational range of resistance, can be used for the far focus position. This can be located with sufficient accuracy without the focusing algorithm as desired.

Having achieved the relatively invariant position $x_{Rmax}$ of the local maximum 61 using the end-stop, it is now possible to make use of the relative invariance in the resistance-position gain of the SMA actuator 30 to use a drive algorithm that defines the lower limit to the operational range of resistance local maximum 60 less a predetermined decrement, rather than for example setting it based on the position of the local minimum 61. By adopting such an algorithm, there are two advantages. Firstly, the variation in the length and performance of the SMA actuator 30, which determines the actual maximum available stroke as limited by the local minimum 61 is hidden from the camera user, meaning that the consistency in the stroke of production modules is increased.

Secondly, it means that the SMA actuator 30 needs to be driven only as far as is needed, which actually aids in minimising the fatigue of the SMA actuator 30 over lifetime, and hence extends the lifetime. Over the lifetime, the SMA actuator 30 length increases, and the available dynamic strain decreases, which means that the stroke available between the local maximum 60 and the local minimum 61 also decreases.

However, by driving to a predetermined decrement below the local maximum 60, these phenomena do not impact on performance.

Therefore the combination of the appropriately positioned end-stop 16, coupled with the use of the local maximum 60 as the position reference, a movement range defined as a fixed resistance decrement below the local maximum 60, and the observation that the resistance-position gain remains relatively invariant provides a drive algorithm that maximises the controllable stroke, maximises the positional accuracy, and minimises both the variations between instances of the camera 1 and the changes in performance over lifetime.

Figure 3:
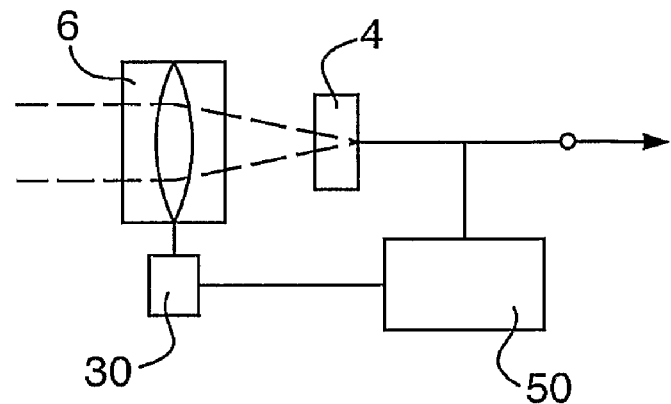
FIG. 3 is a schematic diagram of the overall control arrangement of the camera.

The control arrangement of the camera 1 will now be described. A diagram of the overall control arrangement is shown in FIG. 3. A control circuit 50 is connected to the SMA actuator 30 and applies a drive current thereto to control the temperature of the SMA actuator 30 which moves the lens element 6 and changes the focus of the image formed on the image sensor 4. The output of the image sensor 4 is supplied to the control circuit 50 to be processed for determination of a measure of the quality of focus.

Figure 4:
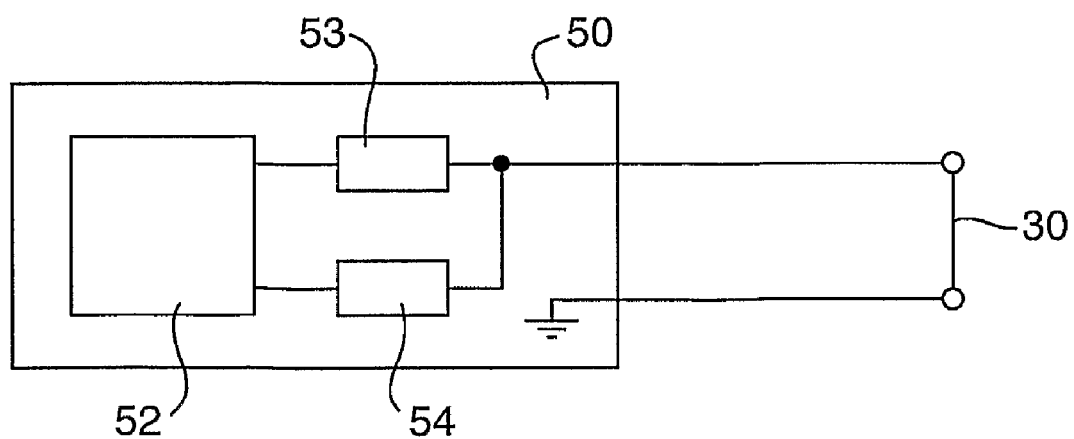
FIG. 4 is a diagram of the control circuit.

The control circuit 50 is shown in FIG. 4. The control circuit 50 is connected to the SMA actuator 30 and supplies a drive current. The control circuit 50 controls the degree of heating of the SMA actuator 30 by varying the power of the drive current flowing therethrough. The control circuit 50 varies the power of the drive current in response to the resistance of the SMA actuator 30 which is used as a measure of the position of the lens element 6. Other measures of position such as the temperature measured by a temperature sensor or a direct measure of the position of the lens element 6 output by a position sensor could be used in principle, but a resistance sensor is advantageous because it does not increase the package size of the camera due to being implemented merely by additional components in the control circuit 50.

The control circuit 50 uses pulse-width modulation (PWM). In particular, the control circuit 50 applies pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the SMA actuator 30 is low and so the wire cools even though some current is being supplied. Conversely, when the duty cycle is at a high value in the range, the SMA actuator 30 heats. The resistance is measured during the current pulse, for example after a short, predetermined delay from the start of the pulse.

The control circuit 50 includes the following components.

The control circuit 50 includes a drive circuit 53 which is connected to supply current to the SMA actuator 30. The drive circuit 53 may be a constant-voltage current source or a constant-current current source. For example, in the latter case the constant current might be of the order of 120 mA.

The control circuit 50 further includes a resistance measurement circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the SMA actuator 30.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

A controller 52 implemented by a suitable microprocessor controls the drive circuit 53 to supply a pulse-width modulated current. The controller 52 receives the resistance measured by the detection circuit 54 and performs the PWM control in response thereto.

Two detailed circuit implementations for the control circuit 50 are shown in FIGS. 17 and 18 of WO-2009/056822.

The control circuit 50 controls the drive current as follows. When operation starts from an unheated state, the control circuit 50 heats the SMA actuator 30 until the local maximum resistance value is detected. This is used as an indication that contraction has started to occur. In fact a small amount of contraction has already occurred. However the local maximum 60 can be easily detected, whereas the start of the positional range Δx cannot. Accordingly, the local maximum 60 is used and this is so close to the start of the positional range Δx that the loss of movement is not significant. Thereafter, the control circuit 50 controls the drive current to change the resistance to a desired target resistance taking the resistance Rmax of the local maximum as a reference. Closed-loop control or open-loop control may be applied.

If closed-loop control is applied, the controller 52 varies the power of the drive current using the measured resistance of the SMA actuator 30 output by the resistance measurement circuit 54 as a feedback signal to drive the measured resistance to the target value.

In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the SMA actuator 30 heats across the active temperature region, the decrease in resistance is sensed and used in a feedback control technique. The stability of the feedback control is maintained by the inherent proportional-integral action of the SMA actuator 30 itself during heating. The overall feedback response is dominated by the response of the whole of the heating of the SMA actuator 30. Such a proportional control feedback loop provides for accurate control of position.

The SMA actuator 30 may have some non-linearities in its response. Such non-linearities may be limited by incorporating precompensation in the control circuit 50. One option is for the precompensation to consist of a gain or offset modifier on the output signal supplied to the drive circuit 53, for example based on the demand and the history of the demand signal. This is most beneficial if insufficient feedback is present to control the SMA actuator 30.

The closed-loop control is applied within an operational range that is between the local maximum 60 and the local minimum 61, being defined by an upper limit at or below the local maximum 60 and a lower limit at or above the local minimum 61. As already mentioned, the upper limit is defined as the local maximum 60 or the local maximum 60 less a predetermined decrement. The lower limit may be defined as the local minimum 61 plus a predetermined increment, but is preferably defined as the local maximum 60 less a predetermined decrement. Examples of closed-loop control that may be used in the camera 1 are disclosed in WO-2007/113478, WO-2008/099156and WO-2009/056822, all of which are incorporated herein by reference.

If open-loop control is applied, the controller 52 varies the power of the drive current in open-loop on the basis of a resistance model of the SMA actuator 30. The parameters of the model may be set using the measured resistance of the SMA actuator 30 output by the resistance measurement circuit 54. Examples of open-loop control that may be used in the camera 1 are disclosed in International Patent Application No. PCT/GB08/004015, which is incorporated herein by reference.

The various types of control described above may be used to drive the movement of the camera lens element 6 to change its position and hence the focus of the lens system 7. The focus may be changed in accordance with any desired algorithm.

The control circuit 50 may implement an autofocus algorithm. In this case, the control may be based on a measure of the focus of the image, for example a modulation transfer function or a spatial frequency response, derived by the controller 52 from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine the resistance value. Then at the end of the scan the lens element 6 is driven back to the same position of the basis of that resistance value rather than the focus measure.

In this case, an image signal from the image sensor 4 is used to derive the primary feedback parameter, any drifting in the absolute values of the measure of the position as a secondary parameter over repeated cycles and age is irrelevant, as there is no perceivable change over the course of a single autofocus cycle. In a given camera 1, the resistance might vary from 10Ω at high temperature to 12Ω at low temperature, and then over the course of several 100 k cycles, this may change to 15Ω at high temperature and 20Ω at low temperature. However, for any given cycle, best focus will correspond to a specific resistance to a sufficient degree of accuracy. Thus it is only necessary to return to this specific resistance, irrespective of its absolute value.

Examples of control algorithms which may be performed by the controller 52 are described in the following applications filed by the same applicant: WO-2007/113478; WO-2008/099156; and WO-2008/129291, all of which are incorporated herein by reference.

An alternative, more standard option for providing an autofocus algorithm is to use a conventional "hill climbing" autofocus algorithm. In this case the algorithm homes in on the desired position from either direction. In this case, it is necessary to find and maintain a given position from both directions, and therefore it is necessary to characterise and compensate for the hysteresis associated with the SMA actuator 30.

Although there has been described above a camera apparatus 1 in which the camera lens element 6 is a movable element, the invention may equally be applied with similar advantages to other types of apparatus wherein an SMA actuator is used to provide precision control of a movable element other than a camera lens element.

The invention claimed is:

1. A shape memory alloy actuation apparatus comprising:
   a support structure;
   a movable element supported on the support structure by a suspension system which guides movement of the movable element along a movement axis;
   a shape memory alloy actuator biased against contraction by a resilient biassing arrangement and arranged on contraction to drive movement of the movable element relative to the support structure, the shape memory alloy actuator under the influence of the resilient biassing arrangement having a property that resistance varies with decreasing length on contraction, and in the absence of end-stops limiting movement, along a curve passing through a local maximum resistance and thereafter through a local minimum resistance; and
   an end-stop arranged to limit movement of the movable element on extension of the shape memory alloy actuator at a position where the shape memory alloy actuator has a predetermined length that is above the length corresponding on said curve to the local maximum resistance by an amount not greater than 15% of the difference between (i) the length corresponding on said curve to the local maximum resistance and (ii) the length corresponding on said curve to the local minimum resistance.

2. A shape memory alloy actuation apparatus according to claim 1, wherein the suspension system comprises a plurality of resilient flexures extending between the support structure and the movable element.

3. A shape memory alloy actuation apparatus according to claim 2, wherein the resilient biassing arrangement comprises solely the plurality of resilient flexures.

4. A shape memory alloy actuation apparatus according to claim 2, wherein the resilient biassing arrangement comprises a resilient biassing element extending between the support structure and the movable element, in combination with the plurality of resilient flexures.

5. A shape memory alloy actuation apparatus according to claim 1, wherein the shape memory alloy actuator comprises at least one length of shape memory alloy wire connected between the support structure and the movable element.

6. A shape memory alloy actuation apparatus according to claim 1, wherein the movable element is a camera lens element, the suspension system guiding movement of the camera lens element relative to the support structure along the optical axis of the camera lens element.

7. A shape memory alloy actuation apparatus according to claim 6, wherein the camera lens element includes one or more lenses having a diameter of at most 10 mm.

8. A shape memory alloy actuation apparatus according to claim 1, wherein the position where the shape memory alloy actuator has a length corresponding on said curve to the local maximum resistance is the infinity position or the hyper focal position of the lens element.

9. A shape memory alloy actuation apparatus according to claim 1, further comprising a control circuit arranged to supply a drive current to the shape memory alloy actuator.

10. A shape memory alloy actuation apparatus according to claim 9, wherein the control circuit includes a resistance measurement circuit arranged to output a measure of the resistance of the shape memory alloy actuator and a controller arranged to vary the power of the drive current to provide closed-loop control of the resistance of the shape memory alloy actuator based on the measure of the resistance of the shape memory alloy actuator output by the resistance measurement circuit.

11. A shape memory alloy actuation apparatus according to claim 10, wherein the controller arranged to vary the power of the drive current to provide closed-loop control of the resistance of the shape memory alloy actuator within an operational range that is between the local maximum resistance and the local minimum resistance and is defined by an upper limit at or below the local maximum resistance and a lower limit at or above the local minimum resistance.

12. A shape memory alloy actuation apparatus according to claim 11, wherein the upper limit is defined as the local maximum resistance or the local maximum resistance less a predetermined decrement.

13. A shape memory alloy actuation apparatus according to claim 11, wherein the lower limit is defined as the local maximum resistance less a predetermined decrement.

14. A shape memory alloy actuation apparatus according to claim 12, wherein the lower limit is defined as the local maximum resistance less a predetermined decrement.

15. A shape memory alloy actuation apparatus according to claim 2, wherein the shape memory alloy actuator comprises at least one length of shape memory alloy wire connected between the support structure and the movable element.

16. A shape memory alloy actuation apparatus according to claim 2, wherein the movable element is a camera lens element, the suspension system guiding movement of the camera lens element relative to the support structure along the optical axis of the camera lens element.

17. A shape memory alloy actuation apparatus according to claim 2, wherein the position where the shape memory alloy actuator has a length corresponding on said curve to the local maximum resistance is the infinity position or the hyper focal position of the lens element.

18. A shape memory alloy actuation apparatus according to claim 6, wherein the position where the shape memory alloy actuator has a length corresponding on said curve to the local maximum resistance is the infinity position or the hyper focal position of the lens element.

19. A shape memory alloy actuation apparatus according to claim 2, further comprising a control circuit arranged to supply a drive current to the shape memory alloy actuator.

20. A shape memory alloy actuation apparatus according to claim 5, further comprising a control circuit arranged to supply a drive current to the shape memory alloy actuator.

* * * * *